(12) United States Patent
Dettmann et al.

(10) Patent No.: US 9,838,086 B2
(45) Date of Patent: Dec. 5, 2017

(54) COMMUNICATION ARRANGEMENT

(71) Applicant: Infineon Technologies AG, Neubiberg (DE)

(72) Inventors: Wolfgang Dettmann, Schliersee (DE); Nicolas Falleau, Chaville (FR); Florian Grimminger, Ballmertshofen (DE); Thomas Herndl, Biedermannsdorf (AT); Gerald Holweg, Graz (AT); Rainer Matischek, Graz (AT); Herbert Roedig, Riemerling (DE)

(73) Assignee: INFINEON TECHNOLOGIES AG, Neubiberg (DE)

(*) Notice: Subject to any disclaimer, the term of this patent is extended or adjusted under 35 U.S.C. 154(b) by 0 days.

(21) Appl. No.: 15/287,767

(22) Filed: Oct. 7, 2016

(65) Prior Publication Data
US 2017/0104513 A1    Apr. 13, 2017

(30) Foreign Application Priority Data

Oct. 8, 2015 (DE) .......................... 10 2015 117 172

(51) Int. Cl.
| H04B 5/00 | (2006.01) |
|---|---|
| H04B 1/00 | (2006.01) |
| H04B 7/00 | (2006.01) |
| H04B 1/3888 | (2015.01) |
| H04L 29/06 | (2006.01) |
| H04W 4/00 | (2009.01) |
| H04W 12/06 | (2009.01) |

(52) U.S. Cl.
CPC ......... *H04B 5/0037* (2013.01); *H04B 1/3888* (2013.01); *H04B 5/0025* (2013.01); *H04L 63/0428* (2013.01); *H04L 63/0492* (2013.01); *H04L 63/08* (2013.01); *H04L 63/0876* (2013.01); *H04W 4/005* (2013.01); *H04W 4/008* (2013.01); *H04W 12/06* (2013.01)

(58) Field of Classification Search
CPC ...................................... H04B 5/0037
USPC .............................. 455/41.1, 41.2, 517, 519
See application file for complete search history.

(56) References Cited

U.S. PATENT DOCUMENTS 9,459,937 B2 * 10/2016 Chai ........................ G06F 9/54
9,602,645 B2 *  3/2017 Eaton ...................... H04M 1/04
(Continued)

*Primary Examiner* — Tilahun B Gesesse
(74) *Attorney, Agent, or Firm* — Viering, Jentschura & Partner mbB

(57) ABSTRACT

A communication arrangement may include a communication device, which may include an application processor, a mobile radio circuit, and a near-field communication (NFC) circuit configured according to an NFC technology for transmission of data and energy for operating a circuit external to the communication device. The arrangement may include a flexible carrier mounted detachably on the communication device. The carrier may include a radio circuit, an NFC circuit configured according to an NFC technology, a circuit coupled to the NFC circuit and the radio circuit, which is configured to be operated with energy which is received by means of the NFC circuit according to the NFC technology, the circuit configured for converting data coded in accordance with the NFC technology into data coded in accordance with the radio technology, or for converting data coded in accordance with the radio technology into data coded in accordance with the NFC technology.

21 Claims, 5 Drawing Sheets

(56) References Cited

U.S. PATENT DOCUMENTS

| | | | |
|---|---|---|---|
| 2011/0269397 A1* | 11/2011 | Bella | H04B 7/15507 455/11.1 |
| 2014/0273822 A1* | 9/2014 | Gutierrez | H04B 5/0031 455/41.1 |
| 2015/0118958 A1 | 4/2015 | Jain et al. | |
| 2015/0215728 A1 | 7/2015 | Wilson et al. | |

* cited by examiner

COMMUNICATION ARRANGEMENT

CROSS-REFERENCE TO RELATED APPLICATION

This application claims priority to German Patent Application Serial No. 10 2015 117 172.4, which was filed Oct. 8, 2015, and is incorporated herein by reference in its entirety.

TECHNICAL FIELD

The present disclosure relates to a communication arrangement.

BACKGROUND

Communication devices in which mobile radio technology is implemented such as, for example, smartphones, PDAs, tablet computers and laptops are increasingly being used and are used for a large number of applications.

Extending these communication devices by additional technologies can be complex and cost-intensive. Depending on the communication device, for example depending on the existing interfaces, extending the communication devices by additional technologies can be made more difficult. An additional technology can be, for example, a radio technology. Radio technologies are used in the private environment and in the industrial environment in a wide spectrum for controlling, regulating or generally for transmitting data. A further additional technology may include, for example, sensors which are configured for acquiring various physical parameters, for example of gases, substances, radioactivity, magnetic fields, motion etc.

SUMMARY

A communication arrangement may include a communication device, which may include an application processor, a mobile radio circuit, and a near-field communication (NFC) circuit configured according to an NFC technology for transmission of data and energy for operating a circuit external to the communication device. The arrangement may include a flexible carrier mounted detachably on the communication device. The carrier may include a radio circuit, an NFC circuit configured according to an NFC technology, a circuit coupled to the NFC circuit and the radio circuit, which is configured to be operated with energy which is received by means of the NFC circuit according to the NFC technology, the circuit configured for converting data coded in accordance with the NFC technology into data coded in accordance with the radio technology, or for converting data coded in accordance with the radio technology into data coded in accordance with the NFC technology.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

In the following detailed description, reference is made to the attached drawings which form a part of it and in which specific embodiments, in which the invention can be exercised, are shown for illustration. In this regard, directional terminology such as "top", "bottom", "front", "rear", etc. is used with reference to the orientation of the figure(s) described. Since components of embodiments can be positioned in a number of various orientations, the directional terminology serves as illustration and is in no way restrictive. Naturally, other embodiments can be used and structural or logical changes can be performed without deviating from the protective scope of the present invention. Naturally, the features of the various embodiments described herein can be combined with one another unless specifically specified differently. The following detailed description should, therefore, not be considered in a restrictive sense and the protective scope of the present invention is defined by the attached claims.

As part of this description, the terms "connected", "joined" and "coupled" are used for describing both a direct and an indirect connection, a direct or indirect joint or a direct or indirect coupling. In the figures, identical or similar elements are provided with identical reference symbols as far as this is appropriate.

Figure 1:
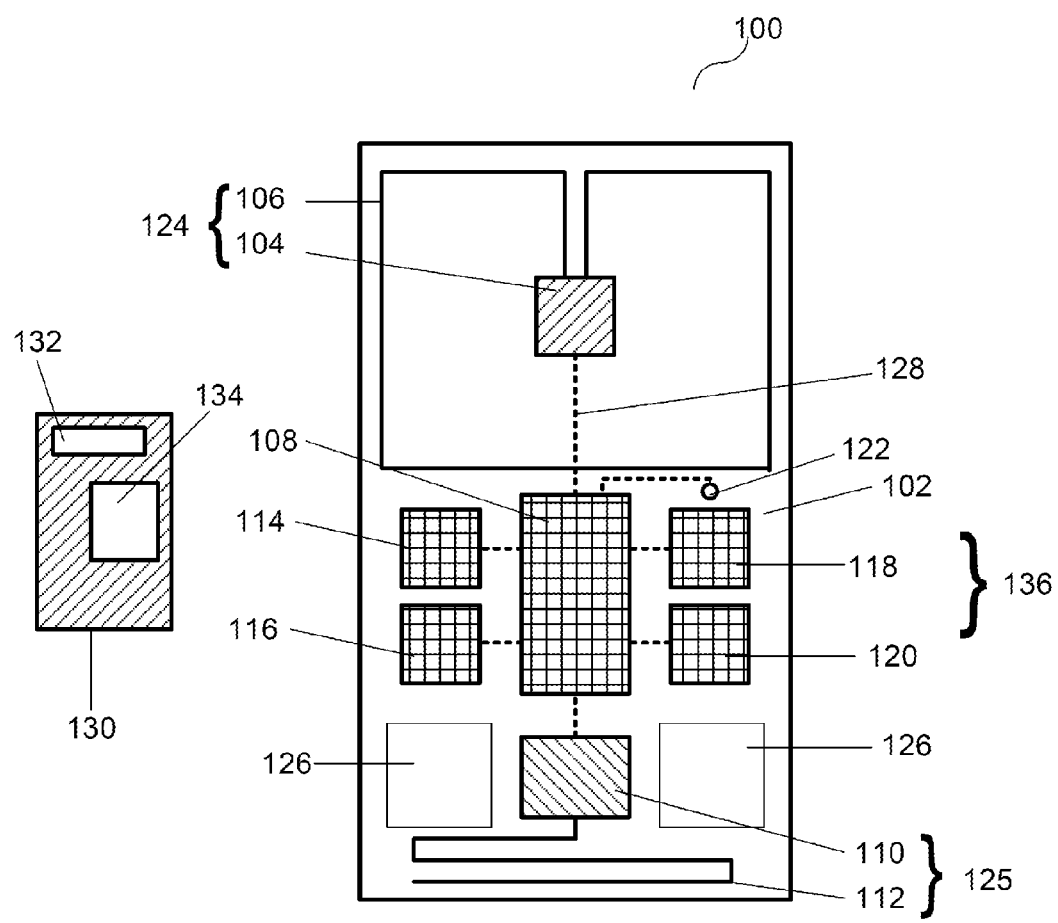
FIG. 1 shows a communication arrangement according to various embodiments.

FIG. 1 shows diagrammatically the communication arrangement 100. For better clarity, the flexible carrier 102 is shown separately from the communication device 130.

The communication device 130 has a near-field communication circuit 134 and an application processor 132.

The flexible carrier 102 has a number of electrical components. These are connected electrically conductively by means of conductor tracks 128. The conductor tracks 128 can be configured for energy and/or data transmission between the electrical components of the flexible carrier 102. The conductor tracks 128, all of which are combined with the reference symbol 128, are shown as dashed lines.

The flexible carrier 102 can have openings (for example through openings) 126 which facilitate or enable the flexible carrier 102 to be mounted in or on the communication device 130.

Additionally, the flexible carrier 102 can have an electrical interface 122 which is configured for a data and/or energy transmission to a circuit external to the flexible carrier.

The near-field communication circuit 124 of the flexible carrier 102 is formed by means of a near-field communication chip 104 and a near-field communication antenna structure 106. The near-field communication circuit 124 is configured for a data and/or energy transmission to the communication device 130. In addition, the near-field communication circuit 124 is configured for a transmission and/or provision of energy and/or data between or for the electrical components of the flexible carrier 102.

The radio communication circuit 125 of the flexible carrier 102 is formed by means of the radio communication chip 110 and a radio communication antenna structure 112. The radio communication circuit 125 is configured for a data transmission according to a radio technology. The radio communication circuit 125 can be configured for a data transmission between an external radio device (not shown) and the electrical components of the flexible carrier 102.

The circuit 136 coupled to the near-field-communication circuit 124 and the radio communication circuit 125 can be formed by means of various electrical components depending on the embodiment. In this example, the circuit 136 has a microprocessor 108 which is configured for coding/decoding data, data processing and data forwarding.

Furthermore, the circuit 136 has an energy memory 114. The energy store 114 can be configured to supply at least parts of the flexible carrier 102 at least temporarily with energy.

Furthermore, the circuit 136 has a data memory 116 which, for example, can store data for the processing and/or can contain identification of electrical components of the flexible carrier 102 and/or data for cryptographic methods and/or data about preceding connections and errors (so-called log files).

In addition, the circuit 136 has a security circuit 118 which is configured to decrypt or encrypt data.

Optionally, the circuit 136 has a filter and amplifier circuit 120 which can stop or alleviate disadvantageous effects, for example interference signals, appropriately for the data transmission by means of the flexible carrier.

In alternative embodiments, a sensor circuit can be formed instead of the radio communication circuit 125. A sensor can have a circuit, for example an integrated circuit such as, for example, a microcontroller and, for example, a sensor head/measuring head. Depending on the construction and type of the sensor, the sensor circuit may include or essentially consist of many, for example individual components. For example, the sensor can be a magnetic field sensor such as, for example, a compass. In this example, the radio communication chip 110 shown can graphically correspond to a microcontroller and the radio communication antenna structure 112 shown can graphically correspond to one or more coils.

Figure 2:
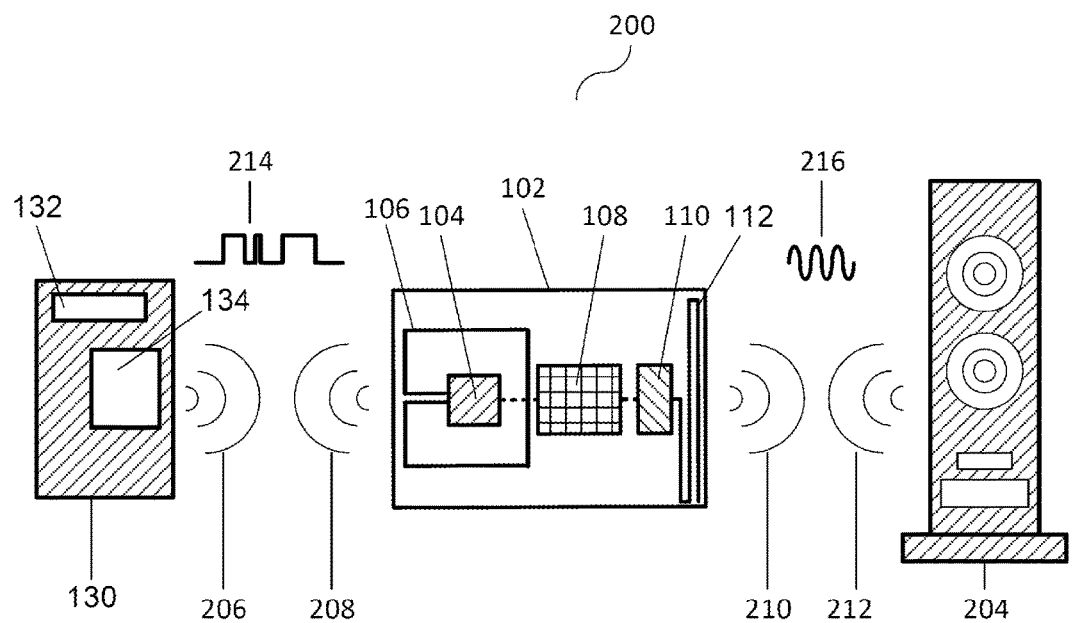
FIG. 2 shows a communication arrangement according to various embodiments.

FIG. 2 shows diagrammatically the communication arrangement 200. The communication device 130 which has an application processor 132 sends a first signal 206 by means of the near-field communication circuit 134. The first signal 206 and the corresponding coding 214 (in the physical layer) according to a near-field communication technology are shown symbolically.

The first signal 206 is received by means of the near-field communication circuit 124 of the flexible carrier 102. The near-field communication circuit 124 is formed by means of the near-field communication chip 104 and the near-field communication antenna structure 106 analogously to FIG. 1. By means of the first signal 206, an energy and data transmission takes place between the flexible carrier 102 and the communication device 130. The near-field communication circuit 124 forwards data received by means of the first signal 206 and energy to the electrical components of the flexible carrier 102.

In this example, the circuit 136 is formed by means of the microprocessor 108. The microprocessor 108 receives the data coded according to a near-field communication technology. Subsequently, the microprocessor 108 converts the coding of the data according to a near-field communication technology into a coding of the data according to a radio technology (converting the coding can take place with regard to one or more communication layers, for example the layer(s) 1, 2 and/or 3). These data are forwarded to the radio communication circuit 125 of the flexible carrier 102. The radio communication circuit 125 is constructed by means of the radio communication chip 110 and the radio communication antenna structure 112 analogously to FIG. 1. The radio communication circuit 125 sends the data according to a radio technology by means of the second signal 210. The second signal 210 and the associated coding 216 according to a radio technology are again shown symbolically.

The electrical device 204 receives the second signal 210. The electrical device 204 can acknowledge the reception of the second signal 210 by sending a third signal 212 according to a radio technology.

The third signal 212 is received by the radio communication circuit 125. The electrical components of the flexible carrier 102 are here supplied with energy according to a near-field technology by means of the near-field communication circuit 124. For example, the communication device 130 can expect an acknowledgement and maintain the energy supply. In alternative embodiments, the energy supply can be ensured by means of an energy store.

Analogously to the process described above, the third signal 212 is converted by means of the microprocessor 108 into data having a coding according to a near-field communication technology (for example in layer 1, 2 and/or 3 or even higher). These data are sent to the communication device 130 as a fourth signal 208 by means of the near-field communication circuit 124. The communication device 130 receives the fourth signal 208. By means of the application processor 132 and the near-field communication circuit 134, the fourth signal 208 is converted into data which, for example, the communication device can display.

Figure 3A:
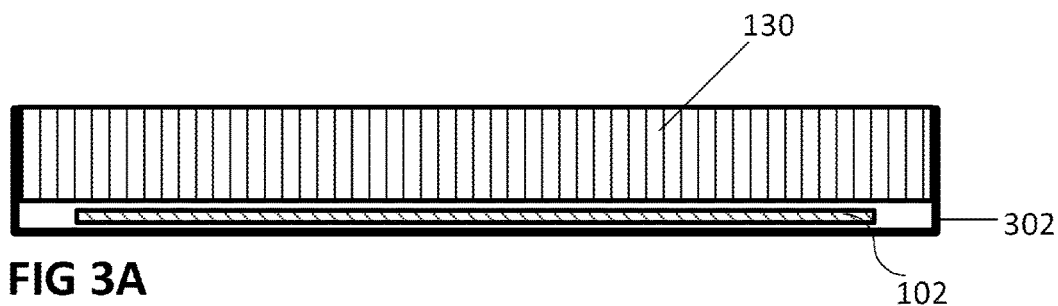
FIG. 3A shows diagrammatically how the flexible carrier in the communication device can be mounted according to various embodiments.

According to one embodiment, FIG. 3A shows diagrammatically how the flexible carrier 102 can be attached in or at the communication device 130, respectively. For this purpose, the flexible carrier 102 is mounted on the cover 302 of the communication device 130, for example by adhesion and/or clamping and/or screwing, in such a manner that the flexible carrier 102 is located in the interior of the housing of the communication device 130.

Figure 3B:
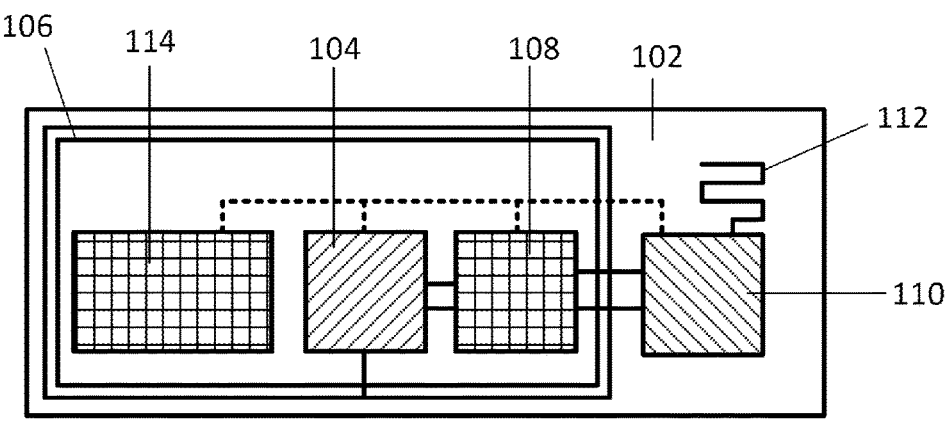
FIG. 3B shows a flexible carrier according to various embodiments.

According to one embodiment, FIG. 3B shows the flexible carrier 102 diagrammatically. The microprocessor 108 is electrically connected to the near-field communication chip 104 and the radio communication chip 110. The energy store 114 is connected electrically to the near-field communication chip 104, the radio communication chip 110 and the microprocessor 108. The near-field communication antenna structure 106 is configured for data and energy transmission according to a near-field communication technology. This can be used for charging up the energy store 114. The radio communication chip 110 is connected to a radio communication antenna structure 112.

Figure 3C:
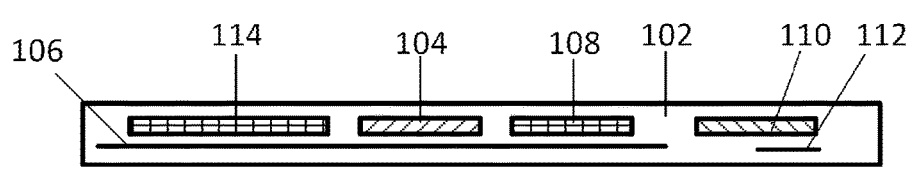
FIG. 3C shows a cross sectional view of a flexible carrier according to various embodiments.

FIG. 3C shows a cross section view of the flexible carrier 102 according to FIG. 3B. In this embodiment, the antenna structures 106 and 112 are mounted in one plane in the sense of the figure and the energy store 114, the near-field communication chip 104, the radio communication chip 110 and the microprocessor 108 are mounted in another plane in the sense of the figure. The positions of the individual electrical components of the flexible carrier 102 can be arbitrary and dependent on suitability.

Figure 3D:
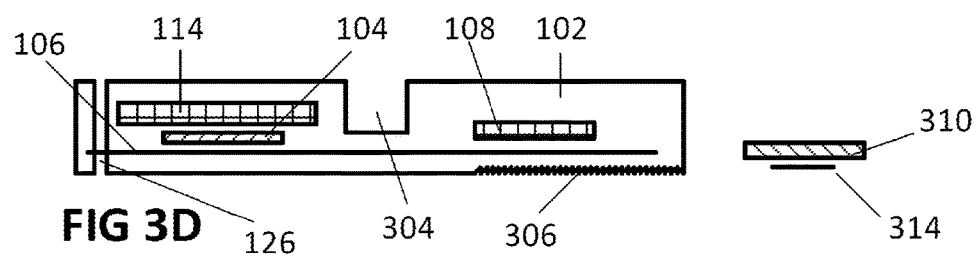
FIG. 3D shows a cross sectional view of a flexible carrier according to various embodiments.

FIG. 3D shows a cross sectional view of the flexible carrier 102 according to a further embodiment. The flexible carrier 102 has openings 126 which can be configured for the attachment in or at the communication device 130. The openings 126 can also be configured to take into account the geometric characteristics of the communication device 130. Similarly, an adaptation to the geometric characteristics of the communication device 130 can take place by means of projections and/or areas having a thickness variation 304 of the flexible carrier 102. The surface of the flexible carrier 102 can have a surface structure 306 in arbitrary areas. As shown by way of example here, electrical components of the flexible carrier 102 can also be mounted below one another in the sense of the figure as shown for the energy store 114 and the near-field communication chip 104. Electrical components of the flexible carrier 102 can also be mounted at least partially outside the flexible carrier 102. For example, a sensor circuit, formed from the microcontroller 310 and a measuring head 314, is mounted outside the flexible carrier 102 (the electrical connection to the electrical components within the flexible carrier not being shown).

Figure 4:
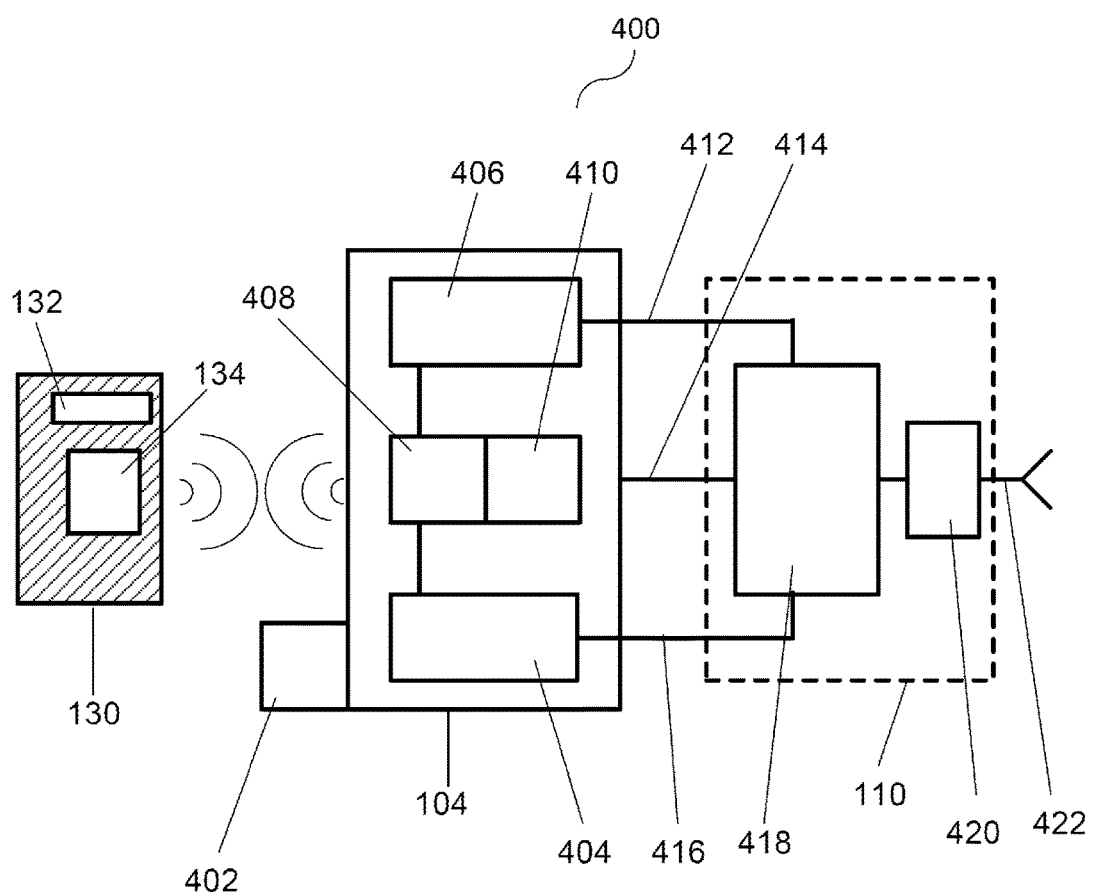
FIG. 4 shows a communication arrangement according to various embodiments.

FIG. 4 shows diagrammatically a communication arrangement 400 according to a further embodiment. An energy and/or data transmission can take place analogously to manners described above. The near-field communication chip 104 has various components. For example, a rectifying and charge pump element 406 can be configured to distribute the energy received according to a near-field communication technology to further parts of the communication arrangement 400. The near-field communication chip 104 can have front-end elements 408 operating analogously, which, depending on the embodiment, can serve as electronic filters and/or amplifiers and/or analog/digital converters. Additionally, the near-field communication chip 104 can have a processor 410 and a clock element 404. The clock element 404 can generate or extract the clock frequency, for example, from the near-field communication frequency (for example 13.56 MHz). This clock frequency can serve as foundation for the operation of all electrical components of the flexible carrier 102. By means of such a clock frequency, separate clock generators can be saved, for example in the radio communication chip 110. In addition, the clock frequency thus generated can be used for one or more phase-locked loop (PLL) circuits, which can be configured to synchronize the data and energy transmission in the various electrical components of the flexible carrier. At and in the near-field communication chip 104, one or more circuits for energy control 402, for example an energy control circuit, can be present. These can be configured to control and/or regulate the energy supply for the electrical components of the flexible carrier 102 at least partially, depending on the state of the communication arrangement 400. The radio communication chip 110 can, as shown here diagrammatically, receive energy 412, receive a clock signal 416 and receive data 414 by means of electrical connections. The radio communication chip 110 can have a transceiver element 418 and a matching element 420 which matches the electrical signals for transmitting the data by means of the radio communication antenna structure 422. In this embodiment, the coding/decoding of data is managed by means of the processor 410. As described above, the circuit 136 coupled to the near-field communication circuit 124 and the radio communication circuit 125 can be integrated into other circuits and/or divided.

Figure 5:
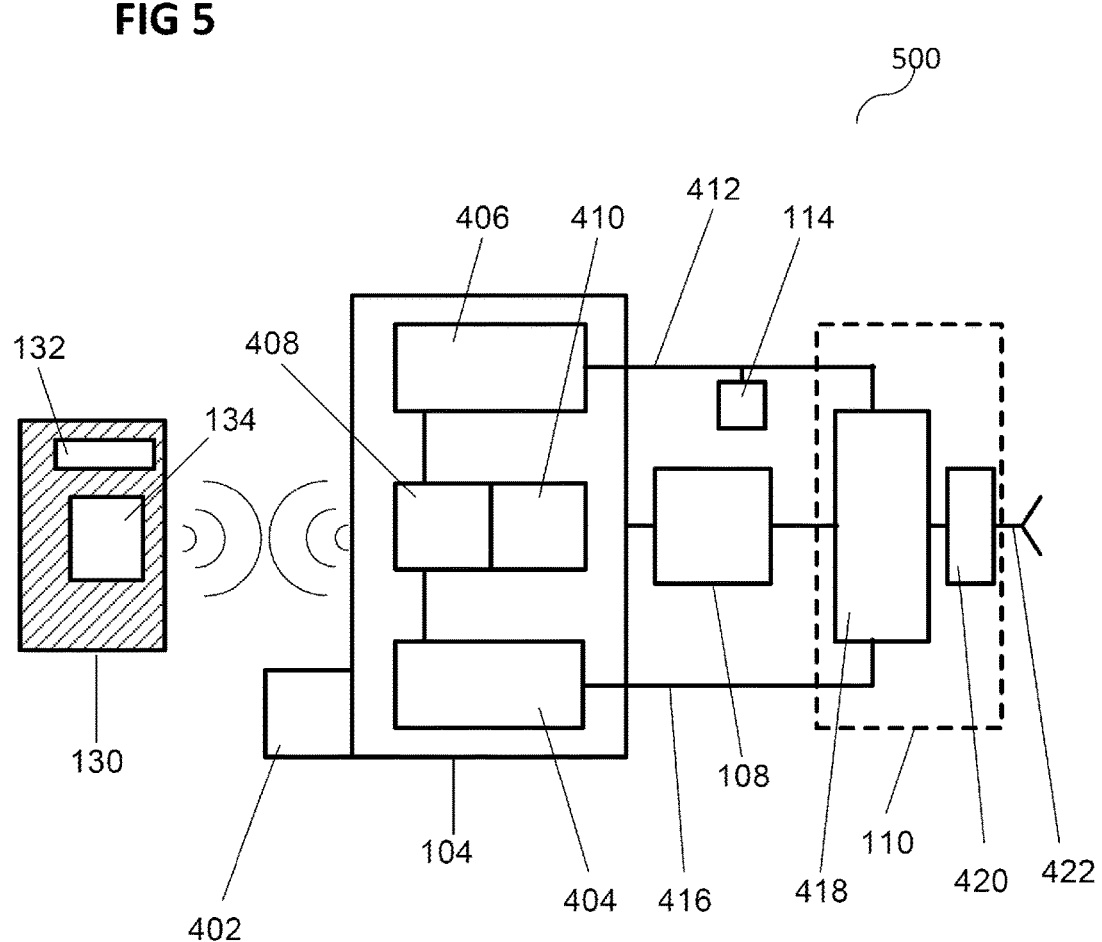
FIG. 5 shows a communication arrangement according to various embodiments.

FIG. 5 shows diagrammatically a communication arrangement 500 according to a further embodiment. The communication arrangement 500 is similar to the communication arrangement 400 apart from the microprocessor 108 and the energy store 114. The energy store 114 can be configured to supply electrical components of the flexible carrier 102 with energy at least temporarily. The energy store 114 can, for example, be charged up by means of the received energy according to a near-field communication technology. The microprocessor 108 can be configured to alter the coding of data.

In various embodiments, a communication arrangement can have: a communication device, having: an application processor, a mobile radio communication circuit, configured for communication according to a mobile radio technology, a near-field communication circuit, configured for communication according to a near-field communication technology by means of which a transmission of data and energy for operating a circuit external to the communication device takes place, and a flexible carrier mounted detachably on the communication device. The flexible carrier can have a radio communication circuit which is configured for communication according to a radio technology which differs from the mobile radio technology, a near-field communication circuit configured for communication according to a near-field communication technology, a circuit, coupled to the near-field communication circuit and the radio communication circuit, which is configured to be operated with energy which is received by means of the near-field communication circuit according to near-field communication technology. The circuit is configured for converting data coded in accordance with the near-field communication technology into data coded in accordance with the radio technology, and/or for converting data coded in accordance with the radio technology into data coded in accordance with the near-field communication technology.

Various other embodiments of a communication arrangement may include: a communication device having: an application processor, a mobile radio communication circuit, configured for communication according to a mobile radio technology, a near-field communication circuit, configured for communication according to a near-field communication technology by means of which a transmission of data and energy for operating a circuit external to the communication device takes place, and a flexible carrier mounted detachably on the communication device. The flexible carrier can have a sensor circuit which is configured for sensing physical parameters, the technology for sensing physical parameters differing from the technology of the communication device. The flexible carrier can also have a near-field communication circuit configured for communication according to a near-field communication technology, a circuit, coupled to the near-field communication circuit and the sensor circuit, which is configured to be operated with energy which is received by means of the near-field communication circuit according to the near-field communication technology. The circuit is configured for implementing an energy and data transmission between the sensor circuit and the near-field communication circuit.

According to various embodiments, the communication device can be, for example, a portable device with microprocessors, for example application processors. Examples are mobile telephones, smartphones, PDAs, tablet computers, notebooks, laptops, ultrabooks, mini- and microcomputers, smartwatches, wearables (electronics embedded in textiles), smartglasses and other devices which come under the categories "augmented reality" and "virtual reality".

The communication device can be configured for communication according to one or more mobile radio technologies such as, for example, GPRS (General Packet Radio Service), GSM (Global System for Mobile Communications), EDGE (Enhanced Data rate for GSM Evolution), UMTS (Universal Mobile Telecommunication System), HSDPA (High Speed Downlink Packet Access), HSPA+ (High Speed Packet Access), LTE (Long Term Evolution), LTE-Advanced 2G, 3G or 4G, respectively (the second, third or fourth generation of the mobile radio standard). Since the mobile radio technology generally continues to develop, this list should be considered to be neither exhaustive nor restrictive. Thus, the communication device can be configured for communication according to one or more mobile radio technologies of the fifth generation (5G).

The application processor of the communication device can be configured to execute computer-implemented applications. For example, a user of the communication device can regulate, control at least parts of the communication arrangement by means of such applications, transmit data and display data. Such applications can also contain management of rights. For example, a user can be identified (e.g. by means of a password) and/or at least parts of the communication arrangement can be identified by means of identifiers. Depending on the identification, a data transmission can be allowed. This can be significant in the case of security-related embodiments. Correspondingly, access authorizations, for example, can be changed by means of the computer-implemented applications. In various embodiments, access authorizations or other data which have been received by means of the mobile radio technology of the communication device can be used for the communication arrangement.

Examples which have security-related aspects can be implemented by means of various techniques and in various environments. Thus, the communication arrangement can be used, for example, as part of an opening and closing system for one or more doors or containers of any type. A door can be, for example, a house door, a vault door or a service door. The door can also be, for example, a vehicle door.

The communication arrangement can additionally also be designed as part of one or more other systems such as, for example, a removal block.

The communication arrangement can be designed as only opening and closing system and/or as part of such a system, for example additionally to mechanical systems such as a key or a biometric system such as, for example, a facial, fingerprint, voice and/or iris recognition system.

Other embodiments can relate to the operation of a device of any type. For example, the communication arrangement can be used for authenticating a user for a device and to allow the operation or the use of the device by one or more users.

A device can be, for example, a computer of any type.

The communication arrangement can provide, for example, individual authorizations for individual users or user groups and/or also special users with special authorizations, for example janitors, cleaning personnel, security services such as the police or fire department.

These examples mentioned should be understood to be neither exhaustive nor restrictive.

The term of the "communication protocol" used in this disclosure designates both the message format of messages by means of which data are transmitted by using the respective "communication protocol" and the manner of data transmission provided in each case. This relates to, for example, the temporal sequence of messages, the combination into messages (also called data packets), generally the syntax and the semantics and synchronization of the data. For example, communication protocols usually add to the data so-called "headers", adding, for example, information about origin, destination and time, generally control information, to the data.

A respective "coding of data" should be understood to mean, for example, the respective message format of messages by means of which the data are transmitted by using the respective "communication protocol".

The communication device has a near-field communication (NFC) circuit. This is configured for data and/or energy transmission according to a near-field communication technology. For example, the near-field communication circuit can be configured similar to an RFID (Radio-Frequency IDentification) circuit. A near-field communication technology is designed for data and energy transmission over short distances, for example a few centimeters. Examples are entry and ticket systems and payment methods. The near-field communication circuit can be configured, for example, for the data and/or energy transmission by means of an electromagnetic frequency around 13.56 MHz. Depending on design, other or further electromagnetic frequencies and/or frequency combinations can also be used. For the energy and/or data transmission, for example, an inductive or capacitive coupling of at least two devices communicating with one another can be provided. The near-field communication circuit can be operated by means of the power supply of the communication device. The near-field communication circuit can be both a fixed component of the communication device as well as a retrofitted part.

The transmission of energy and/or data according to a near-field communication technology can be implemented, for example, by means of electromagnetic waves and/or by means of electromagnetic fields. Correspondingly, the following embodiments should be understood in such a way that both electromagnetic waves and electromagnetic fields can be used for transmitting. For example, energy and data can be transmitted by means of magnetic induction. Correspondingly, the term of "electromagnetic frequency" should be understood in such a way that it relates both to, for example, electromagnetic waves and, for example, the frequency of a magnetic induction field.

According to various embodiments, the flexible carrier has electrical components. These can be connected electrically to one another and illustratively considered to be one or more circuits external to the communication device.

According to various embodiments, the flexible carrier mounted detachably on the communication device can be a, for example multi-layer (for example interlaminated) foil. In various embodiments, such a foil can be attached within and/or at least partially outside the housing of the communication device. The flexible carrier can consist of a number of materials and/or layers. The electrical components of the flexible carrier can be protected against mechanical interactions, liquids and/or gases or other influences. The flexible carrier may include or essentially consist, for example, of one or more plastics, for example one or more polymers or have such plastics. The surface of the flexible carrier can be at least partially adhesive. In or on the flexible carrier any form of images, colors and/or patterns can be attached. These can serve, for example, apart from aesthetic purposes, the color coding and thus the distinguishing of, for example, various communication arrangements.

The flexible carrier can have a thickness of up to, for example, 1.5 mm in various embodiments. In principle, however, the thickness of the flexible carrier can also have another thickness. The thickness can vary within the flexible carrier. In addition, the flexible carrier can have openings. Furthermore, the flexible carrier can have surface structuring in various embodiments. The flexible carrier can be adapted to the geometric situations of the communication device. A surface structuring can be used for improving the adhesion of the flexible carrier to the communication device. A surface structuring can be configured for a better strength of grip for a user in the case where the flexible carrier is mounted outside the communication device.

According to various embodiments, the communication arrangement can have a radio communication circuit and/or a sensor circuit. The geometric form, for example, or the materials of which the flexible carrier consists can be adapted accordingly. The flexible carrier or parts thereof can support or provide for, for example, the acquisition of information by means of the sensor.

The radio communication circuit can be configured differently depending on the embodiment. By means of the radio communication circuit, various applications can be implemented. For example, the communication arrangement can serve as one or more radio remote controls, remote controls, motor vehicle keys, smart home applications, light controls, heating controls, power controls, music controls, radio sockets or corresponding combinations. The radio communication circuit can transmit data, for example by means (or by means of combination, respectively) of the following electromagnetic frequencies or within a range around these frequencies: 13.56 MHz, 149 MHz, 401-406 MHz, 430-440 MHz, 863-870 MHz or 2.4 GHz. The radio communication circuit can also be configured for signal transmission in one or more frequency ranges of conventional radio communication protocols such as Bluetooth, Z-wave, ZigBee or Wireless MBus. The radio technology differs from the mobile radio technology of the communication device in the electromagnetic spectra used in each case and/or in the communication protocols used in each case.

According to various embodiments, the flexible carrier can have a sensor circuit which is configured for sensing one or more physical parameters, the technology for sensing one or more physical parameters differing from the technology of the communication device.

For example, the sensor circuit may include one or more sensors which are configured for acquiring various physical parameters, for example of gases, substances, radioactivity, magnetic fields, motion, etc. Correspondingly acquired information can be sent to the communication device by means of the flexible carrier. The communication device can be configured to control and/or regulate the sensor. The processing of the information acquired by the one or more sensors can take place, for example, both by means of electrical components of the flexible carrier and by means of the communication device.

The flexible carrier can have, for example, both one or more sensors and also one or more radio communication circuits.

Acquiring/distributing/transmitting/processing of data can be designed arbitrarily in this context.

The near-field communication circuit of the flexible carrier can be designed, for example, for a read/write mode and/or a peer-to-peer mode and/or a card emulation mode or combinations of the modes, respectively.

According to various embodiments, the near-field communication circuit can have similar characteristics as the near-field communication circuit, described above, of the communication device. For example, the near-field communication circuit can use an electromagnetic transmitting and/or receiving frequency around 13.56 MHz. In various embodiments, an interface is formed for data and power transmission between the communication device and the flexible carrier by means of the near-field communication circuit of the communication device and of the near-field communication circuit of the flexible carrier. The near-field communication circuit of the flexible carrier can be active, passive, semiactive or semipassive, respectively. I.e., it can be operated by means of the electromagnetic waves (for example by means of magnetic induction) and/or also have an energy store, for example an accumulator or a battery.

The circuit coupled to the near-field communication circuit and the radio communication circuit and/or the sensor circuit can be used for coding/decoding, forwarding and processing data between and for the electrical components of the flexible carrier. The circuit can be used for data transmission between the near-field communication circuit and the radio communication circuit and/or the sensor circuit. For example, the circuit can be configured to recognize and replace or convert the communication protocol of data, i.e. to code and/or decode the data. Additionally, the circuit can add or withdraw information to or from the data, respectively. The circuit can be configured to collect information about the data by means of a data memory.

The circuit coupled to the near-field communication circuit and the radio communication circuit and/or the sensor circuit can have at least one filter circuit and/or at least one amplifier circuit. These can be configured to eliminate their interfering influences (for example due to the radio signal transmission) and/or to amplify signals in order to ensure a data transmission.

According to various embodiments, the flexible carrier can have a security circuit which is configured to process data by means of cryptographic methods.

The cryptographic methods enable a data transmission to become incomprehensible for a third party, for example a further receiving device or a further user, respectively, and thus uncopyable or non-manipulable. The security circuit can have a data memory, among other things, for implementing the cryptographic methods. Depending on the embodiment, the communication device can be configured to replace or alter the cryptographic methods, for example a cryptographic key, of the security circuit. Examples of such cryptographic methods are symmetric (for example AES or DES) or asymmetric encryption methods (for example RSA), methods for digital signature, or cryptographic hash methods (for example MD2 or MD5).

Furthermore, according to various embodiments, the security circuit can be configured for other applications. For example, the security circuit can be configured for the detection of data which are unsuitable or falsely interpretable, or data which can disturb the normal sequence. In addition, the security circuit can be configured for checking whether at least parts of the communication arrangement and/or the user of the communication arrangement and/or a device, to which data are transmitted by means of the radio communication circuit and/or the sensor circuit, have required authorizations or a corresponding identification, respectively. Depending on the result of a checking by means of the security circuit, it can be configured to restrict, to repeat or even completely end a data transmission by means of the flexible carrier.

According to various embodiments, the radio communication circuit can be configured for the data transmission according to at least two mutually different radio technologies, where the radio technologies can differ in the coding of the data and/or in the electromagnetic frequencies used.

Thus, for example, a number of devices can be operated with the communication arrangement in accordance with various radio technologies. In addition, an increase in the data transmission rate can also be implemented by means an enlarged usable electromagnetic frequency spectrum, for example. According to various embodiments, various radio technologies can be configured, for example exclusively for transmitting or for receiving data. Due to the at least two mutually different radio technologies, the flexible carrier can have accordingly a number of radio communication antenna structures. Electrical components which the flexible carrier has can be adapted accordingly. For example, the circuit coupled to the near-field communication circuit and the radio communication circuit can be correspondingly designed for the coding/decoding according to a number of radio technologies.

According to various embodiments, the sensor circuit can be configured for acquiring at least two different chemical and/or physical parameters. The sensor circuit can have, for example, one or more microcontrollers or chips and one or more measuring heads.

In the case where the flexible carrier has both one or more radio communication circuits and one or more sensor circuits, these circuits can interact, for example. Thus, the sensor circuit can use, for example, an antenna structure of a radio communication circuit for acquiring information.

According to various embodiments, the flexible carrier can be integrated monolithically into the housing of the communication device.

For example, the flexible carrier can have a similar geometric shape as parts of the housing of the communication device. In various examples, the detachably mounted flexible carrier has the shape of a removable battery cover of a smartphone. In various embodiments, parts of the communication device can be utilized electrically as an antenna or as an extension of an antenna structure, respectively. Thus, for example, an antenna structure of the radio communication circuit can be connected electrically to an at least partially electrically conductive housing part of the communication device in order to thus form an extended antenna structure. In other embodiments, a sensor circuit can use, for example, a housing part of the communication device as a sensor or as part of a sensor.

According to various embodiments, the flexible carrier can be mounted detachably in or on the housing of the communication device by adhesion or screwing and/or clamping.

The flexible carrier can be designed for mechanical fixing, for example by means of openings or threads. The flexible carrier can have at least one adhesive surface. Depending on the embodiment, the mounting can be designed in such a manner that the flexible carrier can be detached from the communication device more easily or with more difficulty.

According to various embodiments, the near-field communication circuit of the flexible carrier can generate a clock frequency with which the near-field communication circuit and/or the radio communication circuit and/or the circuit coupled to the near-field communication circuit and the radio communication circuit is operated.

According to various embodiments, the near-field communication circuit can generate a clock frequency by means of which the near-field communication circuit and/or the sensor circuit and/or the circuit coupled to the near-field communication circuit and the sensor circuit is operated.

For example, the near-field communication circuit can extract the clock frequency from the electromagnetic frequency of the communication according to a near-field communication technology. A clock frequency can predetermine the operating clock of electrical components of the flexible carrier. These electrical components can thus be operated without their own clock frequency generator which can lead to a saving in costs, space and material.

According to various embodiments, the flexible carrier can have a permanent energy store which is configured for supplying energy to at least one electrical component of the flexible carrier.

This permanent energy store can be a battery (for example a thin-film battery) and/or an accumulator. The permanent energy store can supply at least one electrical component of the flexible carrier with energy. The permanent energy store can be charged up, for example, by means of the near-field communication circuit according to a near-field communication technology.

The permanent energy store can supply at least, for example, parts of the radio communication circuit and/or of the sensor circuit with energy. For example, a sensor can be operated by means of this energy or the power of a radio communication circuit can be increased.

According to various embodiments, the permanent energy store can be configured for supplying energy to electrical components of the flexible carrier, for example in the case where the flexible carrier has a radio communication circuit and no energy is received by the near-field communication circuit. For example a signal according to a radio technology can be received/transmitted by means of the flexible carrier and the signal conveyed to the communication device by means of the flexible carrier. The flexible carrier can also be configured for a data transmission according to a radio technology without involving the communication device. In other words, a data transmission can take place by means of one or more permanent energy stores which has not been initiated by the communication device and/or exists independently of the communication device. Analogously, for an embodiment with a sensor circuit instead of the radio communication circuit, the sensor circuit can acquire data by means of energy of the permanent energy store and convey these, for example, at a later time, for example collectively to the communication device.

According to various embodiments, the flexible carrier and the communication device can have an electrical interface, optionally in the form of one or more electrical contacts which are designed for a transmission of data and/or energy between the flexible carrier and the communication device.

By means of the electrical interface, at least one electrical component of the flexible carrier can be supplied at least temporarily with energy, for example.

The electrical interface can be used for data transmission. For example, the flexible carrier and/or the communication device can check whether the communication device and/or the flexible carrier are suitable or authorized, respectively, as components of the communication arrangement. By means of the electrical interface, information with respect to status and/or maintenance can be transmitted.

According to various embodiments, the flexible carrier can have an identity check circuit which is configured to check the identity of a user of the communication arrangement and/or the identity of at least a part of the communication arrangement.

For example, the identity check circuit can block a data transmission by means of the flexible carrier at least partially depending on the result of a test. The identity check circuit can be configured to convey the result of a test to the communication device by means of the flexible carrier.

According to various embodiments, the flexible carrier can have an energy control circuit which is configured to control the energy supply of at least one electrical component of the flexible carrier.

For example, the energy control circuit can be configured to change, to control or to regulate at least the energy supply of an electrical component of the flexible carrier. For example as part of a so-called wake-up mode, power-down mode and sleep mode. The energy control circuit can be configured to convey information with respect to the energy supply to the communication device by means of the flexible carrier. In various embodiments, the communication device can regulate and/or control the energy control circuit.

In various embodiments, the near-field communication circuit of the flexible carrier can be configured, apart from a data and energy transmission to the communication device, also for a data and energy transmission to further near-field communication devices. For example, a further near-field communication device can be a smartcard or an RFID chip. These can change temporarily or permanently, for example, the communication protocols, cryptographic data or authorizations, which can be stored on a data store of the flexible carrier. According to a further embodiment, the further near-field communication devices can also be one or more additional flexible carriers. Thus, the functionality of the communication arrangement can be enhanced further or the communication arrangement can be retrofitted.

The structure and the electrical connections of the electrical components of the flexible carrier can be implemented quite differently in various embodiments. The delimitation between the near-field communication circuit and/or the radio communication circuit and/or the sensor circuit and/or other circuits may not be unambiguous, for example not obvious by means of separate components. Thus, for example, at least parts of the circuits can be integrated in a single microprocessor. Various combinations of at least various parts of the circuits can be integrated with one another in one or more microprocessors.

The communication arrangement can also be part of other arrangements. Thus, for example, use of the communication arrangement can be allowed, triggered, detected and/or stored by means of the mobile radio technology of the communication device. For example, the communication arrangement can be operated with a so-called "cloud".

According to one embodiment, a user can issue a control command to a smartphone. The smartphone checks by means of stored data whether the user has the appropriate rights. For example, there can be a password enquiry. If the user is authorized, the smartphone conveys the control command. This occurs by means of the interface which is formed by means of the near-field communication circuits of the communication device and of the flexible carrier. For this purpose, the control command is converted by the communication device into data according to a communication protocol according to a near-field communication technology. In addition, the data are supplemented with additional information about time, identity of the user and identity of the smartphone.

The flexible carrier can be constructed as two-layer (generally multi-layer) electrically insulating foil from polymers. The electrical components of the flexible carrier are located, for example, between the layers of the two-layer foil. The surface of the two-layer foil has an adhesive by means of which the two-layer foil adheres to the inside of the battery cover of the smartphone. The two-layer foil which has, for example, a thickness of approximately 1.5 mm, is located in the interior of the housing of the smartphone. According to the near-field communication technology, the near-field communication circuit of the flexible carrier receives energy and the data.

In one embodiment, the data, i.e. the coded control command, can be transferred subsequently from one communication protocol according to a near-field communication technology into a communication protocol according to a radio technology (illustratively, the data are recoded). The transferred data are subsequently encrypted by means of a cryptographic algorithm. The data are now interpretable for a motor vehicle locking mechanism and conveyable for the radio communication circuit. By means of the radio communication circuit, the data thus coded are conveyed to an electrical motor vehicle locking mechanism according to a radio technology. The electrical motor vehicle locking mechanism checks the data, for example for the identity of the user and/or the identity of at least parts of the communication arrangement. This checking of the electrical motor vehicle locking mechanism can contain cryptographic methods. After a successful check, the electrical motor vehicle locking mechanism opens the motor vehicle door and sends a success signal via radio communication. Analogously, the radio communication circuit receives this success signal and forwards it to the smartphone by means of the flexible carrier. This indicates to the user that the door of the motor vehicle has been opened.

In a further embodiment, the data, i.e. the coded control command, can be transferred subsequently from a communication protocol according to a near-field communication technology into a communication protocol according to a sensor technology (illustratively, the data are recoded). The sensor circuit has a microcontroller for controlling two sensor measuring heads and the two sensor measuring heads. The sensor measuring heads are configured to measure the content of carbon dioxide and carbon monoxide in the surrounding atmosphere. The control command causes the sensor circuit to perform 20 sequential measurements per measuring head. The microcontroller of the sensor circuit stores the results of the individual measurements and forms two mean values. The mean values are subsequently transmitted to the communication device by means of the flexible carrier. The communication device can display these mean values to the user of the communication arrangement.

According to various embodiments, the communication device can be configured to calibrate the sensor circuit.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication system, comprising:
   a communication device and a flexible carrier,
   wherein the communication device; further comprises
      an application processor;
      a mobile radio communication circuit, configured for communication according to
      a mobile radio technology; and
      a near-field communication circuit, configured for communication according to a near-field communication technology, wherein the near-field communication circuit is configured to transmit data and energy for operating a circuit external to the communication device;
wherein the flexible carrier is mounted detachably on the communication device and further comprises
a radio communication circuit configured to transmit according to a radio technology which differs from the mobile radio technology;
a near-field communication circuit configured to communicate according to a near-field communication technology;
a circuit, coupled to the near-field communication circuit and the radio communication circuit, which is configured to be operated with energy received by the near-field communication circuit according to the near-field communication technology, the circuit being configured to perform at least one of converting data coded in accordance with the near-field communication technology into data coded in accordance with the radio technology for transmission via the radio technology, or converting data coded in accordance with the radio technology into data coded in accordance with the near-field communication technology for transmission via the near-field communication technology.

2. The communication system of claim 1, wherein the radio communication circuit is configured to transmit data according to at least two mutually different radio technologies, the radio technologies differing by at least one of the coding of the data or the electromagnetic frequencies used.

3. The communication system of claim 1, wherein the near-field communication circuit is configured to generate a clock frequency with which at least one of the near-field communication circuit, the radio communication circuit, or the circuit coupled to the near-field communication circuit and the radio communication circuit is operated.

4. The communication system of claim 1, wherein the flexible carrier comprises a security circuit which is configured to process data by means of a cryptographic methods.

5. The communication system of claim 1, wherein the flexible carrier is monolithically integrated into the housing of the communication device.

6. The communication system of claim 1, wherein the flexible carrier is mounted in or on the housing of the communication device by at least one of adhesion, screwing, or clamping.

7. The communication system of claim 1, wherein the flexible carrier comprises a permanent energy store which is configured for supplying energy to at least one electrical component of the flexible carrier.

8. The communication system of claim 1, wherein the flexible carrier and the communication device comprises an electrical interface in the form of one or more electric contacts which are configured a to transmit of at least one of data or energy between the flexible carrier and the communication device.

9. The communication system of claim 1, wherein the flexible carrier comprises an identity check circuit which is configured to check at least one of the identity of a user of the communication arrangement or the identity of at least a part of the communication arrangement.

10. The communication system of claim 1, wherein the flexible carrier comprises an energy control circuit which is configured to control the energy supply of at least one electrical component of the flexible carrier.

11. A communication system, comprising:
a communication device and a flexible carrier,
the communication device further comprising
an application processor;
a mobile radio communication circuit, configured to communicate according to a mobile radio technology; and
a near-field communication circuit, configured to communicate according to a near-field communication technology by transmitting data and energy for operating a circuit external to the communication device;
the flexible carrier being mounted detachably on the communication device, and further comprising
a sensor circuit configured to sense physical parameters, the technology for sensing physical parameters differing from the technology of the communication device;
a near-field communication circuit configured to communicate according to a near-field communication technology;
a circuit, coupled to the near-field communication circuit and the sensor circuit, and being configured to be operated with energy received by the near-field communication circuit according to the near-field communication technology, the circuit being configured for energy and data transmission between the sensor circuit and the near-field communication circuit;
wherein the circuit is further configured to perform one of
receiving data via the near-field communication technology and converting the data for transmission via a mobile radio technology different from the mobile radio technology of the mobile radio communication circuit; or
receiving data via a mobile radio technology different from the mobile radio technology of the mobile radio communication circuit and converting the data for transmission via a near-field communication technology.

12. The communication system of claim 11, wherein the near-field communication circuit is configured to generate a clock frequency with which at least one of the near-field communication circuit, the sensor circuit, or the circuit coupled to the near-field-communication circuit and the sensor circuit is operated.

13. The communication system of claim 11, wherein the flexible carrier comprises a security circuit which is configured to process data using cryptographic methods.

14. The communication system of claim 11, wherein the flexible carrier is monolithically integrated into the housing of the communication device.

15. The communication system of claim 11, wherein the flexible carrier is mounted in or on the housing of the communication device by at least one of adhesion, screwing, or clamping.

16. The communication system of claim 11, wherein the flexible carrier comprises a permanent energy store which is configured for supplying energy to at least one electrical component of the flexible carrier.

17. The communication system of claim 11, wherein the flexible carrier and the communication device comprises an electrical interface in the form of one or more electric contacts which are configured to transmit at least one of data or energy between the flexible carrier and the communication device.

18. The communication system of claim 11, wherein the flexible carrier comprises an identity check circuit which is configured to check at least one of the identity of a user of the communication arrangement or the identity of at least a part of the communication arrangement.

19. The communication system of claim 11, wherein the flexible carrier comprises an energy control circuit which is configured to control the energy supply of at least one electrical component of the flexible carrier.

20. A flexible carrier comprising:
- a radio communication circuit configured for communication according to a radio technology;
- a near-field communication circuit configured to communicate according to a near-field communication technology;
- a circuit coupled to the near-field-communication circuit and the radio communication circuit, which is configured to be operated with energy received by the near-field-communication circuit according to the near-field communication technology, the circuit being configured to perform at least one of converting data coded in accordance with the near-field communication technology into data coded in accordance with the radio technology for transmission via the radio technology, or converting data coded in accordance with the radio technology into data coded in accordance with the near-field communication technology for transmission via the near-field communication technology.

21. A flexible carrier comprising:
- a sensor circuit configured to sense physical parameters;
- a near-field communication circuit configured to communicate according to a near-field communication technology;
- a circuit, coupled to the near-field communication circuit and the sensor circuit, and being configured to be operated with energy received by the near-field communication circuit according to the near-field communication technology, the circuit being configured for energy and data transmission between the sensor circuit and the near-field communication circuit
- wherein the circuit is further configured to perform one of receiving data via the near-field communication technology and converting the data for transmission via a mobile radio technology; or receiving data via a mobile radio technology and converting the data for transmission via a near-field communication technology.

* * * * *